(12) United States Patent
Satrasala et al.

(10) Patent No.: US 10,623,121 B1
(45) Date of Patent: Apr. 14, 2020

(54) SYSTEMS AND METHODS FOR TIME DELAY ESTIMATION

(71) Applicant: NXP USA, Inc., Austin, TX (US)

(72) Inventors: Lokesh Sundaramurthy Satrasala, Bangalore (IN); B Hari Ram, Chennai (IN); Sri Varsha Rottela, Visakhapatnam (IN); Niranjan Grandhe, San Jose, CA (US); Christian Raimund Berger, San Jose, CA (US); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/528,116

(22) Filed: Jul. 31, 2019

Related U.S. Application Data (60) Provisional application No. 62/712,576, filed on Jul. 31, 2018.

(51) Int. Cl.
*H04B 3/46* (2015.01)
*H04B 17/364* (2015.01)
*H04W 24/08* (2009.01)

(52) U.S. Cl.
CPC .......... *H04B 17/364* (2015.01); *H04W 24/08* (2013.01)

(58) Field of Classification Search
CPC .... H04B 17/364; H04B 3/46; H04B 17/0042; H04B 17/004; H04W 24/08; H04L 1/20; H04L 1/24
USPC ................................. 375/224, 219, 295, 316
See application file for complete search history.

(56) References Cited

U.S. PATENT DOCUMENTS

2013/0235949 A1* 9/2013 Jeckeln ................. H04L 27/361
375/295

* cited by examiner

*Primary Examiner* — Zewdu A Kassa (57) ABSTRACT

Embodiments described herein provide a method for time delay estimation in a wireless communication system. A signal received, from a transmitter, is delayed due to hardware components in the receiver. A time domain representation of a computed complex channel impulse response (CIR) is generated. A first set of peaks of a time domain representation of the complex CIR is determined and a first peak, having a lowest time delay of the first set of peaks relative to the arrival time of the signal at the receiver, is identified. Following the interpolation of a region corresponding to the first peak, a second set of peaks is determined, and a more accurate estimation of the delay experienced by the signal through the receiver is determined.

20 Claims, 7 Drawing Sheets

SYSTEMS AND METHODS FOR TIME DELAY ESTIMATION

CROSS-REFERENCE TO RELATED APPLICATION

This application claims the benefit under 35 U.S.C. § 119(e) of U.S. Provisional Patent Application No. 62/712,576, filed Jul. 31, 2018, which is hereby incorporated by reference herein in its entirety.

FIELD OF USE

This disclosure relates to time delay estimation in a wireless local area network system, and specifically, increased accuracy in time delay estimation using time domain channel estimates.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Accurate time delay estimation has applications in ranging, localization, and synchronization, for example. Increased accuracy improves the abilities of wireless networks to locate nodes within its network. In some instances, location estimates are determined using distance and range estimates between nodes such as an access point and a client station. For example, in IEEE 802.11 wireless communication systems, accurate time delay estimation is important for indoor localization where the required degree of location accuracy is within centimeters rather than meters. For surveillance applications, synchronization between nodes in a network is required for reliable location estimates determined from multilateration techniques that rely on time delays received at synchronized receivers.

Time delay estimations can be obtained by calculating the group delay using the frequency response of received signals. However, this technique does not provide sufficient accuracy as required for various applications that are highly sensitive to time delay errors.

SUMMARY

Embodiments described herein provide a method for time delay estimation in a wireless communication system. A signal is received, from a transmitter. The signal is delayed due to hardware components in a receiver. A complex channel impulse response (CIR) of the received signal is computed at the receiver. The complex CIR includes an in-phase component and a quadrature component. A time domain representation of the computed complex CIR is generated. A first plurality of peaks of a time domain representation of the complex CIR is determined. From the first plurality of peaks, a first peak having a lowest time delay of the first plurality of peaks relative to an arrival time of the signal at the receiver is identified. From the time domain representation of the complex CIR, a selection of data points adjacent to the first peak is interpolated. From the interpolated selection of data points adjacent to the first peak, a second plurality of peaks is determined. From the second plurality of peaks, a second peak indicative of a time delay estimate of the delay caused by the hardware components in the receiver having a lowest time delay of the second plurality of peaks relative to the arrival time of the signal at the receiver is identified.

In some embodiments, the magnitudes of data points of the complex CIR indicative of a power of the complex CIR are determined from the time domain representation of the complex CIR. The magnitudes of the data points of the complex CIR are compared to a noise threshold. The first plurality of peaks having magnitudes surpassing the noise threshold are selected.

In some embodiments, a data point of the complex CIR having the largest magnitude of data points of the complex CIR is determined. Based on the magnitudes of the data points of the complex CIR, the data point of the complex CIR is determined to be a peak of the first plurality of peaks.

In some embodiments, a selection of data points of the in-phase component of the time domain representation of the complex CIR adjacent to the first peak is interpolated and a selection of data points of the quadrature component of the time domain representation of the complex CIR adjacent to the first peak is interpolated.

In some embodiments, based on the interpolated selection of data points of the in-phase component, the interpolated selection of data points of the quadrature component is computed. The computation is a reconstructed time domain representation of the complex CIR. A data point of the reconstructed time domain representation of the complex CIR having the largest magnitude of data points of the reconstructed time domain representation of the complex CIR is determined. Based on decreasing magnitudes of data points adjacent to the data point, the data point is determined to be a peak of the second plurality of peaks.

In some embodiments, a data point of the in-phase component adjacent to the first peak having the largest magnitude of data points of the in-phase component adjacent to the first peak is determined. Based on magnitudes of data points of the in-phase component adjacent to the first peak, the data point of the in-phase component adjacent to the first peak is determined to be a peak of a third plurality of peaks of the in-phase component adjacent to the first peak. A data point of the quadrature component adjacent to the first peak is determined to have the largest magnitude of data points of the quadrature component adjacent to the first peak. Based on magnitudes of data points of the quadrature component adjacent to the first peak, the data point of the quadrature component is determined to be a peak of a fourth plurality of peaks of the quadrature component adjacent to the first peak.

In some embodiments, a third peak of the third plurality of peaks having a lowest time delay of the third plurality of peaks relative to the arrival time of the signal at the receiver is identified. A fourth peak of the fourth plurality of peaks having a lowest time delay of the fourth plurality of peaks relative to the arrival time of the signal at the receiver is identified. The second peak is determined using a weighted mean of respective time delays of the third peak and the fourth peak relative to the arrival time of the signal at the receiver.

In some embodiments, the first plurality of peaks amounts to a predetermined number of determined peaks.

In some embodiments, the complex CIR is separated into the in-phase component and the quadrature component. A data point of the in-phase component is determined to have the largest magnitude of data points of the in-phase component. Based on magnitudes of data points of the in-phase component, the data point of the in-phase component is determined to be a peak of the plurality of peaks of the in-phase component. A data point of the quadrature component is determined to have the largest magnitude of data points of the quadrature component. Based on magnitudes of data points of the quadrature component, the data point of the quadrature component is determined to be a peak of the plurality of peaks of the quadrature component In some embodiments, a peak of the plurality of peaks of the in-phase component having a lowest time delay of the plurality of peaks of the in-phase component is identified. A peak of the plurality of peaks of the quadrature component having a lowest time delay of the plurality of peaks of the quadrature component is identified.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for time delay estimation. A delay estimation system is described herein for providing an increase in the accuracy of time delay estimates of wirelessly transmitted signals that are delayed by effects such as multipath.

Wireless communications systems rely on accurate time delay estimate for various applications, from military surveillance to commercial Internet surfing. For localization, increased time delay estimation accuracy provides improved location-based services. For synchronization, increased time delay estimation accuracy provides higher data transfer rates in a multi-user system, for example.

Wireless communications systems are burdened with inherent problems such as the delay in time that signals experience as they are processed through the radio frequency (RF) components in a receiver (e.g., RF filters or amplifiers). Different RF components do not necessarily affect the signal with the same delay as it passes through the components of the receiver. In some implementations, signals composed of multiple frequencies do not pass through the receiving device at a uniform delay because the components will enact varying delays depending on the frequency. For a simplified example, consider a channel impulse response received in a practical receiver system having delays due to such RF components, h(t), as a weighted sum of delayed Dirac Deltas.

$$h(t) = \sum_i \beta_i \delta(t - T_i)$$

Channel impulse response h(t) is a sum of delayed impulses that are delayed by $T_i$ and scaled by weight $\beta_i$ along the $i^{th}$ path. Practical receiver systems limit the bandwidth of signals received such that the effective impulse response becomes a function of the impulse response, s(t), of a band-limited filter.

$$h(t) = \sum_i \beta_i s(t - T_i)$$

These delayed impulses each follow paths within the receiver. These paths may be the same or different from each other, depending on the receiver structure. As described previously, in some embodiments, the signal is delayed due to the RF components along the receiving path and the delay can vary depending on the frequency components of the signal. In some embodiments, the delayed impulse arriving first has a line-of-sight (LOS) path to the receiver and is not reflected or refracted from non-air mediums such as water, trees, people, or buildings. In some implementations, an impulse that arrives after the LOS signal arrives is either further delayed by the RF components in the receiver or, if the RF components enacted the same delay onto it as onto the LOS signal, by a time called the first path delay or non-LOS (NLOS) delay (i.e., the wireless medium prior to the receiver delayed this copy of the signal). Systems and methods herein provide an estimate for the delay caused by the RF components in the receiver. In particular, the delay estimate system described herein computes an estimate that is more accurate than conventional systems obtain by using only frequency domain channel estimates (e.g., obtaining the group delay from the frequency domain channel impulse response). The delay estimation system described herein achieves increased accuracy over conventional systems by at least the use of interpolation in the time domain, enhancing the resolution of the time scale and in turn, allowing for an improved estimate of delay. An advantage of using the time domain includes determining the time delay caused by RF components in a receiver with less computation than is needed for same determination in the frequency domain. In an implementation, the delay estimate system computes a time delay estimate with less computation cycles by applying downsampling in the frequency domain representation of the complex channel impulse response. The systems and methods described herein are applicable to both single and multi-antenna systems.

Figure 1:
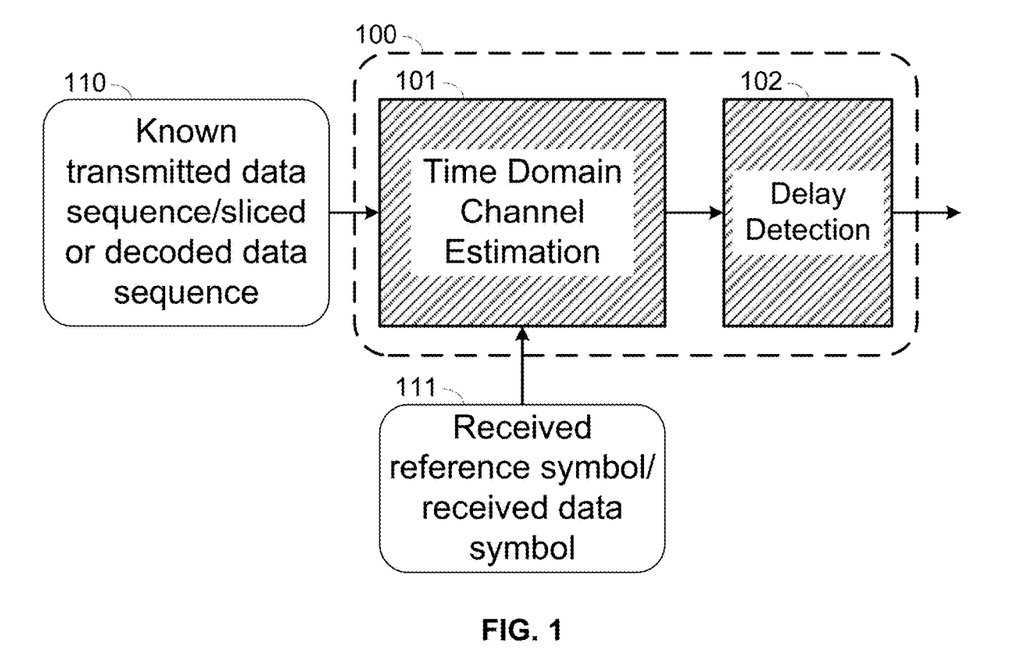
FIG. 1 is a block diagram of an illustrative wireless communications system for detecting time delays using a time domain channel estimation in accordance with at least some embodiments of the present disclosure.

FIG. 1 is a block diagram illustrating wireless communications system for detecting time delays using time domain channel estimation, according to some embodiments described herein. In an embodiment, delay estimation system 100 includes control circuitry programmed to perform the time delay estimation processes described herein such as time domain channel estimation process 101 and delay detection process 102.

Delay estimation system 100 receives known data sequences 110 and reference symbols 111. In some instances, although not depicted, a receiver is coupled to delay estimation system 100 to receive data sequences 110 and reference symbols 111 transmitted by another wireless communications node (e.g., an access point in a WLAN system) and provide them to delay estimation system 100. In some instances, a receiver system comprises delay estimation system 100. Reference symbols, or training symbols, are removed from the received data sequence to obtain a complex time domain channel estimate or channel impulse response (CIR) in time domain channel estimation process 101. If training symbols are not available (e.g., long training fields (LTF) are not available) and the system has access to the received signal in the data field, the delay estimation system, in some implementations, decodes the data to determine the channel estimates that otherwise would have been computable from the training symbols. Delay estimation system 100 performs delay detection process 102 in which the complex CIR is processed to determine an estimated time delay.

Figure 2:
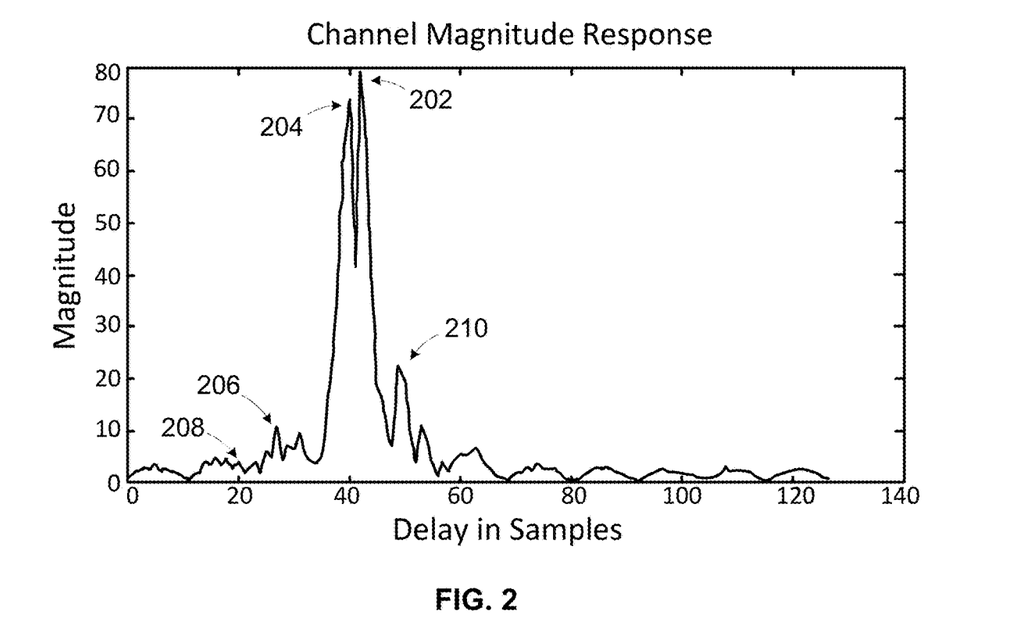
FIG. 2 is a graph of an illustrative channel magnitude response computed by the illustrative wireless communications system of FIG. 1 in accordance with at least some embodiments of the present disclosure.

FIG. 2 is a graph of an illustrative channel magnitude response computed by the illustrative wireless communications system of FIG. 1 in accordance with at least some embodiments of the present disclosure. The channel magnitude response depicted shows two prominent peaks 202 and 204 detected at approximately 40 and 43 samples, respectively, of delay. In some implementations, a peak is designated as a point among ordered data points having a value that is higher than the values of data points surrounding it. Zero delay in samples, as shown in the x-axis of FIG. 2, is indicative of a time at which the data is taken, and N samples of delay is indicative of a time that is N samples in time after a time at which a signal is received. The units of channel magnitude are Watts, decibels (dB), decibel-watts (dBW), or any suitable measure of power. In some implementations, a receiver is associated with a fixed RF delay. In particular, this fixed RF delay accounts for the estimated delay faced by signals being received by the receiver and at certain bandwidths. In some embodiments, the computed magnitude response of the received signal is plotted with an offset corresponding to the fixed RF delay. For example, a fixed RF delay of 30 samples applied to the illustrative channel magnitude response of FIG. 2 would shift the graph shown by 30 samples to the left (e.g., peak 204 located at 10 samples of delay rather than the 40 samples of delay as shown in FIG. 2). It should be understood that the graph of FIG. 2, as referenced in this description, will not have the fixed RF delay already applied to it. The delay in samples that is referenced herein will refer to a delay relative to when the signal was received at the receiver and when it had finished traveling through the RF receiver path having RF components that caused the delay.

The illustrative channel magnitude response of FIG. 2 shows peak 202 at 43 samples of delay and peak 204 at 40 samples of delay. Peak 202 has a magnitude of approximately 79 Watts and peak 204 has a magnitude of approximately 73 Watts. In this illustrative channel magnitude response, the signal having peak 204 has arrived earlier than the signal having peak 202. In some implementations, peak 204 is the LOS signal because it has arrived earlier, traveling along the most direct path in the wireless medium. In some embodiments, the signal having peak 202 has a higher magnitude due to the constructive reflection of multipath signals that increased its amplitude despite not traveling the LOS path (i.e., experiencing more path loss than when traveling the LOS path). For this reason, the method for time delay estimation described herein finds, in some implementations, the peak that has both the highest magnitude of peaks above a noise threshold and has arrived the earliest. For example, peak 204 of FIG. 2 is the peak to be used for time delay estimation with, for example, a noise threshold of 40 Watts because it has arrived the earliest of the peaks having a magnitude above 40 Watts.

Reference to the x-axis values of FIG. 2 are referred to herein using the term "samples" or "samples of delay," where the samples are indicative of a time since the signal was received by a receiver (i.e., the time that the signal took to pass through RF components of a receiver). Unless otherwise specified, reference to "samples" or "samples of delay" will be understood to mean a number of samples indicative of a time since a signal was received by a receiver. For example, 3 samples of delay is taken as meaning a time delay of 3 units, measured as samples, long after the signal had arrived at the receiver. In some embodiments, the delay estimation system determines peaks of a computed CIR with at least the steps of identifying a maximum data point and detecting data points of decreasing values surrounding the maximum data point. A method of determining peaks, including the LOS peak, is described in detail in the description of FIG. 3.

From the channel magnitude response, in some implementations, high-magnitude peak regions are determined. In some embodiments, a peak region is characterized by a point with decreasing channel magnitude values around it. As referred to herein, "around a peak" is understood to mean the samples immediately to the left and to the right of the peak or adjacent to the peak, samples that are a predetermined number to the left or to the right of the peak (e.g., 5 samples to the left and right of a peak at a sample point), any suitable measure of samples or data points within proximity of a peak, or any combination thereof. In some embodiments, the delay estimation system begins a search for a peak region by identifying a maximum magnitude value of the channel magnitude response. For example, the maximum magnitude value of the graph depicted in FIG. 2 is 79 Watts, corresponding to the value of peak 202. In some instances, the delay estimation system then performs a peak region estimation following the process outlined in FIG. 3 to determine the peak region surrounding a maximum magnitude value. For example, the delay estimation system determines that the peak region corresponding to peak 202 ranges from samples 42 to 48. The delay estimation system determines the ranges from samples 42 to 48 by at least detecting decreasing values of points surrounding the peak. In some implementations, the delay estimation system then zeroes out the determined peak region to determine secondary peaks. The delay estimation system zeroes out the peak region by setting the magnitude value of the data points, including the peak, to zero. For example, the channel magnitude response will have values of zero from samples 42 to 48 after the delay estimation system zeroes out the determined peak region for peak 202. In some embodiments, the peak location (e.g., the x-axis value "40" of the data point corresponding to peak 204) and region data are stored by the delay estimation system to determine the time delay estimation. In some implementations, the delay estimation system then repeats this peak region estimation method of finding a maximum value, determining a corresponding peak region, and zeroing out the peak region for the next largest magnitude value that remains after a first peak region (e.g., samples 42-48) has been zeroed out. For example, after determining and zeroing out the peak region for peak 202, the delay estimation system determines a second peak region for peak 204 (e.g., samples 32-41). In some instances, the delay estimation system continues to repeat peak region estimation until a predetermined number of peak regions are found. In some embodiments, the search space used by the delay estimation system to find peaks and to estimate peak regions is limited to the space to the left of the strongest peak magnitude or peak region, where the space to the left of the strongest peak includes signals that have arrived earlier. In some implementations, the peak having the highest magnitude is already the leftmost peak that is above a noise threshold.

In some embodiments, the delay estimation system performs peak detection on the data represented in a channel magnitude response graph, for example as seen at FIG. 2 in which peaks are seen at least at reference numerals 202 through 210. Not all peaks 202 through 210 are necessarily detected by the delay estimation system due to constraints such as a maximal number of peaks that can be detected by the delay estimation system, a noise threshold that must be surpassed for a signal to be deemed indicative of a peak rather than noise, a search area, any suitable constraint for refining the peak-searching boundaries, or any combination thereof. In some embodiments, a noise threshold may be a percentage of the magnitude of the maximum peak value (e.g., 50% of 79 W). For example, if a predetermined number of peaks the delay estimation system can detect is set to 2, and the noise threshold is set to 39.5 W, the search is limited to peaks to the left of the peak exceeding 10 W that has the highest magnitude (i.e., arriving, in time, before the arrival time of a peak having the highest magnitude). Under these constraints, the delay estimation system detects and registers peak 204 in FIG. 2 as a peak to be considered for the determination of the time delay estimate. Peak 204 which has a magnitude of approximately 73 Watts satisfies example constraints both by having a magnitude above a noise threshold of 10 Watts and by arriving earlier than peak 202 having the highest magnitude of all peaks in the CIR. Peak 204, when the delay estimation system searches for peaks based on decreasing magnitude values, is detected by the delay estimation system. According to this example where the system is predetermined to detect 2 peaks maximum, the delay estimation system would only detect peak 204 because no other peak to the left of peak 202 satisfies the noise threshold requirement.

In some instances, the delay estimation system determines the initial presence of a peak based on a data point having the largest magnitude in a set of data points, determining the peak region surrounding that data point, and setting the magnitude values for the data points of the peak region to zero (i.e., zeroing out the peak region). In some instances, delay estimation system then repeats this process with the remaining data points and finds the peak with the next largest magnitude. Following this example of a process, the delay estimation system determines that peak 202 is the LOS peak because the magnitude of the peak is the largest magnitude among respective magnitudes for the set of data points. The delay estimation system zeroes out the magnitudes of the peak region and peak values of peak 202 and repeats this process for the CIR response that has been updated with zero values. For this updated CIR response, peak 204 is the newly largest peak. The delay estimation system determines the peak and peak region for peak 204.

However, in some instances, the delay estimation system receives signals corresponding to peaks 208 and 210 however these peaks are not registered because of detection constraints such as a predefined maximal number of number of detectable peaks, failure to exceed a noise threshold, or location outside of a search area. For example, after detecting peak 204, the delay estimation system will stop searching for further peaks, including peaks 206, 208, and 210, because no other peak has surpassed the example noise threshold of 39.5 W. In an implementation, peak 208, which has a magnitude of approximately 4 Watts and therefore does not surpass the example noise threshold of 39.5 Watts, is not even considered by the delay estimation system as being the peak having the lowest delay value relative to the arrival of the LOS peak. Peak 210, which has a time of arrival that is approximately 10 sample units in time after peak 202, is also not considered by the delay estimation system as a candidate for being the peak having the lowest delay relative to the arrival of the signal because, in the example, due to predetermined restriction of the search area limited to peaks arriving before the arrival time of the peak having the largest magnitude.

Figure 3:
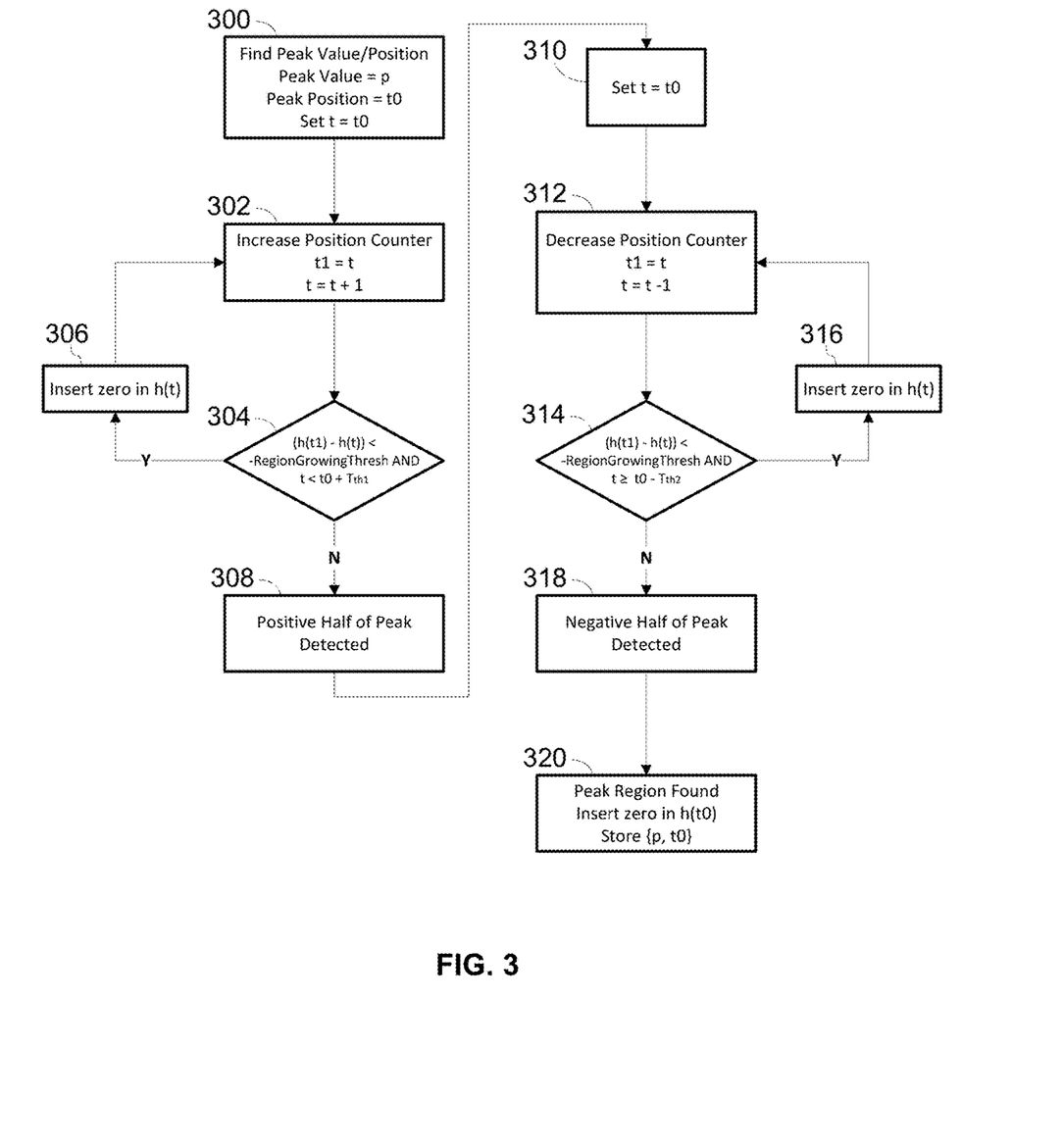
FIG. 3 is a flow diagram of an illustrative process for peak region estimation implemented by the illustrative wireless communication system of FIG. 1 to estimate peak regions in the illustrative channel magnitude response of FIG. 2 in accordance with at least some embodiments of the present disclosure.

FIG. 3 is a flow diagram of an illustrative process for peak region estimation implemented by the illustrative wireless communication system of FIG. 1 to estimate peak regions in the illustrative channel magnitude response of FIG. 2 in accordance with at least some embodiments of the present disclosure. The process implements a counter "that allows for incremental movement along the channel magnitude response that detects both halves of a peak region and simultaneously zeroes out the peak region as it is detected. In some embodiments, the two halves of a peak correspond to the decreasing values to the left (e.g., a first half or negative half) and to the right (e.g., a second half or positive half) of a peak region.

At step 300, the delay estimation system finds the maximum value of the channel magnitude response, h(t), and initializes the following variables according to this value. Variable "peak value" for recording the value of the peak is set to "p" (e.g., 79 for peak 202 in FIG. 2). Variable "peak position" for recording the value of the sample at which the peak is located is set to "t0" (e.g., 43 for peak 202 in FIG. 2). Position counter "t" is initialized to value "t0".

At steps 302-306, the delay estimation system zeroes out the positive half of a peak. At step 302, the delay estimation system increments the position counter "t" by one sample. At step 304, the delay estimation system determines whether the magnitude difference between the channel magnitude response at the current position of position counter "t" and the previous position of counter "t" is less than a region growing threshold. For example, the delay estimation system determines, for the response depicted in FIG. 2, that a value of t=44 is less than a region growing threshold of value 48, which is 43 plus 5 (e.g., a position of a peak plus a predetermined value to extend beyond the peak). The delay estimation system also determines whether the counter has been incremented at least $T_{th1}$ times. If both the difference in magnitude between two data points is greater than the threshold and the counter has not been incremented at least $T_{th1}$ times, the delay estimation system proceeds to step 306 to insert a zero at h(t), where t is the position of the counter. When either the difference in magnitude between two data points is less than a threshold or the counter has been incremented at least $T_{th1}$ times, the delay estimation system exits the loop to proceed to step 308 where it determines that the positive half of the peak is detected. For example, the delay estimation system determines that the positive half of peak 202 of FIG. 2 extends from samples 44 to 48 and sets the h(t)=0 for t in the range 44 to 48.

After the positive half of the peak is detected, the delay estimation system proceeds to step 310 to reset position counter "t" to peak position t0. Steps 312-316 function similarly to steps 302-306 for the negative half of the peak. For example, in FIG. 2, the negative half of peak 202 are samples to the left of t=43. In this example, after steps 312-316, the h(t) is set to zero for values of t that satisfy the conditional statements in step 314. For example, when t=42 (e.g., at sample 42, the sample to the left of or adjacent to sample 43), the difference in magnitude between h(43) and h(42) is less than a threshold and t=42 is greater than a stopping point indicated by "t0-Tth2" (e.g., "43-5" or 38). In some implementations, the delay estimation system then proceeds to step 316 to set h(t=42)=0. In some embodiments, once either the difference in magnitude between two data points or value of t fails to satisfy the respective tests in step 314, the delay estimation system proceeds to step 318. At step 318, the delay estimation system determines that the negative half of the peak has been detected. Finally, at step 320, the delay estimation system determines that the peak region has been found, sets h(t0) to zero, and stores the association of peak value p with position to. In some embodiments, the delay estimation system stores information discovered through steps 300-318 and is not limited to storing peak value and the respective sample position tO. In some instances, the delay estimation system stores the samples that correspond to the peak region. For example, for the peak at t0=43, the delay estimation system stores a record of samples 42-48 as defining the corresponding peak region.

Figure 4:
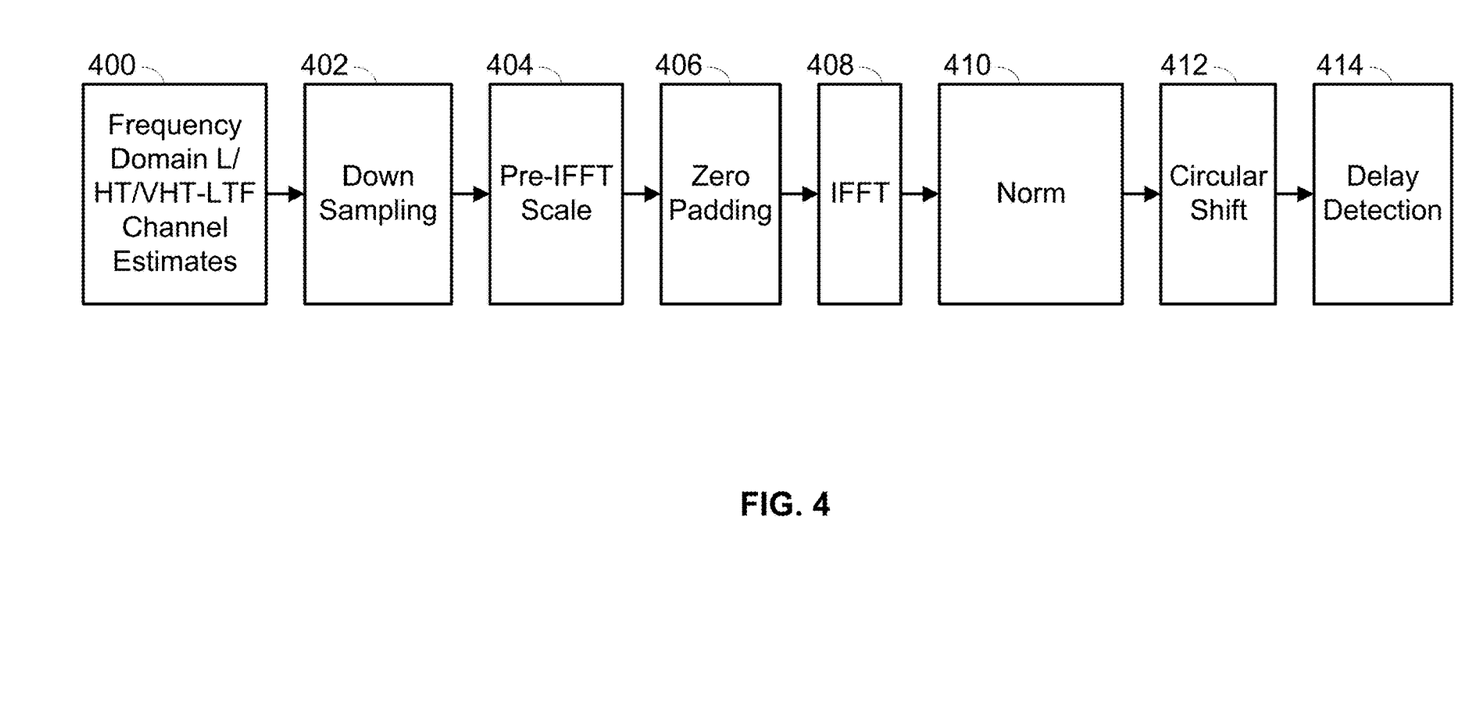
FIG. 4 is a block diagram of an illustrative process for time delay estimation implemented in a wireless local area network system and by the illustrative wireless communication system to estimate the time delay of a received signal having the illustrative channel magnitude response of FIG. 2 in accordance with at least some embodiments of the present disclosure.

FIG. 4 is a block diagram of an illustrative process for time delay estimation implemented in a wireless local area network system and by the illustrative wireless communication system to estimate the time delay of a received signal having the illustrative channel magnitude response of FIG. 2 in accordance with at least some embodiments of the present disclosure. In some embodiments, blocks 400-414 represent a chronological process for implementing time delay estimation for WLAN systems such as Wi-Fi systems.

At block 400, the delay estimation system receives a channel estimate in the frequency domain, where the fields of data packets providing the channel estimate are, in some implementations, one of legacy, high throughput, or very high throughput long training field types. At block 402, the delay estimation system performs downsampling on the received channel estimate to reduce unnecessary computation of tail ending samples of channel impulse responses that are, in some instances, of very low magnitude. In some embodiments, multipath causes a delay spread that produces low-magnitude delayed channel impulse responses with delays greater than the LOS signal. In particular, in some embodiments, the received signal traveling a LOS path and its copies that are affected by multipath arrive at the receiver with decreasing magnitudes of power due to pathloss. The data points received some time after the LOS signal data points are received are much lower in magnitude than the LOS signal's magnitude.

At block 404, the delay estimation system scales the magnitude response of the frequency domain channel estimates before taking the inverse Fast Fourier Transform (IFFT) to preserve energy of the signal across the transform. In some implementations, the operation of an IFFT has an inherent scaling factor that reduces the energy of a signal that is about to have an IFFT applied to it. Block 404 scales the magnitude response in anticipation to this inherent scaling done by IFFT operations. At block 406, the delay estimation system zero-pads the frequency domain channel estimate to increase the accuracy of time delay estimates. Because zero-padding in the frequency acts to upsample in the time domain, there is an increased number of samples when an IFFT converts the channel response in the frequency domain to the time domain. At block 408, the delay estimation system takes the IFFT of the frequency domain channel estimate in order to obtain the time domain channel estimate. At block 410, the delay estimation system calculates a norm of the vector representing the complex CIR to obtain the magnitude of complex CIR. At block 412, the delay estimation system performs a circular shift of the complex CIR in the time domain to incorporate the non-causal part of the channel response. In some implementations, circular shift also allows the delay estimation system to focus on certain regions of the channel impulse response where the delay spread is more likely to occur, reducing the number of computations required. At block 414, the delay estimation system determines the estimated time delay using any of the processes described herein.

Figure 5:
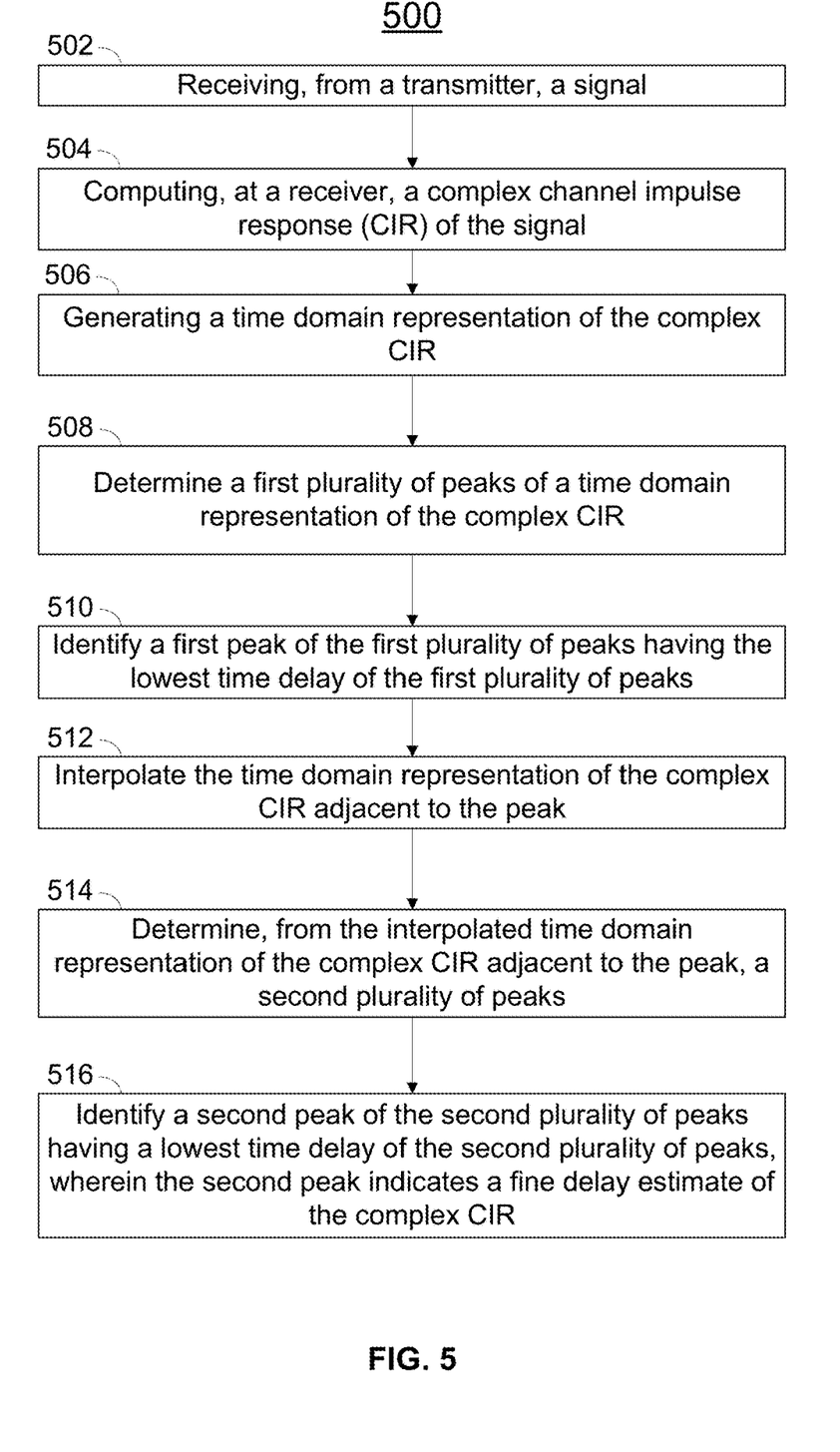
FIG. 5 illustrates a process for time delay estimation implemented by the illustrative wireless communication system in a delay detection block of the block diagram in FIG. 4 in accordance with at least some embodiments of the present disclosure.

FIG. 5 illustrates process 500 for time delay estimation implemented by the illustrative wireless communication system in delay detection block 414 of the block diagram in FIG. 4 in accordance with at least some embodiments of the present disclosure. In some implementations, process 500 is performed by control circuitry of delay estimation system 100 described in FIG. 1. While the process of FIG. 5 is discussed in relation to a single antenna system, it is understood that a similar process for time delay estimation is, in some embodiments, implemented for a multi-antenna system.

At block 502, the delay estimation system receives, from a transmitter, a signal. In some instances, the delay estimation system receives a signal from a transmitter in a WLAN communication network (e.g., an access point). The signal, once received, travels through RF components of the receiver (e.g., amplifiers and RF filters), is delayed by the RF components, and spreads into multiple copies of itself that arrive for output by the receiver at different times. In some implementations, delay be caused in the wireless medium by multipath. In cases of multipath, the first copy of the signal to arrive at the receiver is the LOS signal that has a corresponding LOS peak and LOS arrival time. The second copy of the signal arrives at a time after the LOS signal arrives, where the difference in time is the first path delay.

At block 504, the delay estimation system computes, at a receiver, a complex CIR of the signal. In some implementations, the system uses the methods described in FIG. 4 for computing the complex CIR of the signal. For example, the delay estimation system receives the channel estimate in the frequency domain, downsamples the channel estimate in the frequency domain to reduce complexity of future computation, applies a scaling factor to the magnitude of the channel estimate, and pads the data points of the channel estimate with zeros to increase the accuracy of the time delay estimate.

At block 506, the delay estimation system generates a time domain representation of the complex CIR. In some implementations, the system uses the methods described in FIG. 4 for generating the time domain representation of the complex CIR of the signal. For example, the delay estimation system applies an IFFT to the complex CIR computed at block 504, computes a vector norm, and performs a circular shift of the samples in the time domain to account for the non-causal portion of the channel estimate.

At block 508, the delay estimation system determines a first plurality of peaks of a time domain representation of a complex CIR. In some embodiments, a process as described in FIG. 3 is used to find peaks of a complex CIR. In some implementations, the delay estimation system loops through steps 300-320 until a predetermined number of peaks are found. This is further described in the description of FIG. 6. In some embodiments, the delay estimation system implements a noise threshold such that peaks are considered only if their magnitude surpasses a minimum power disqualifying it from being mistaken as noise (e.g., the thermal noise of a receiver). For example, consider peak 208 at sample 20 of FIG. 2 with corresponding magnitude of 3. In some instances, this peak is disqualified by the delay estimation system as a peak because the magnitude of 3 does not surpass a noise threshold that is set to a value of 10. In some embodiments, the delay estimation system determines the first plurality of peaks of the complex CIR by finding peaks in both the in-phase and quadrature components of the complex CIR separately. This is described further in the description of FIG. 9. In some embodiments, the first plurality of peaks is determined based on an examination of a portion of the complex CIR in the time domain that is to the left of the LOS peak. For example, in the channel magnitude response of FIG. 2, peak 202 is the LOS peak and peaks 204, 206, and 208 are peaks to the left of the LOS peak. In some embodiments, the delay estimation system implements multiple receiver antennas and determines the first plurality of peaks based on frequency domain channel estimates received at respective antennas.

At block 510, the delay estimation system identifies a first peak of the first plurality of peaks having the lowest time delay of the first plurality of peaks, where the delay is taken relative to the arrival of the LOS peak. For example, the delay estimation system determines that peak 204 is the first peak of the first plurality of peaks detected from the channel magnitude response of FIG. 2 because it has a lower time delay to the LOS peak than do the peaks to the left of the LOS peak, peak 202. In some instances, the lowest time delay is determined by comparing the time or sample differences between the time at which the peaks to the left of the LOS peak and the time at which the LOS peak occurred. For example, peak 204 has a time delay of approximately 3 samples from the arrival of peak 202 while the peak 206 has a time delay of approximately 14 samples from the arrival of peak 202. Because peak 204 has the lowest delay compared to any of the peaks to the left of peak 202, the LOS peak, the delay estimation system identifies, in some implementations, peak 204 as the peak having the lowest delay. The identified peak having the lowest delay relative to the arrival time of the signal at the receiver is associated with the estimate of the delay. In some embodiments, the delay estimation system determines the peak location with the lowest delay for the in-phase component of the complex CIR and the quadrature component of the complex CIR separately. This is described in the description of FIG. 9.

At block 512, the delay estimation system interpolates the time domain representation of the complex CIR adjacent to the peak. Interpolation is critical in improving the accuracy of the time delay estimation. By interpolating the magnitude response of a time domain representation of the complex CIR adjacent or around the peak, the delay estimation system determines, in some instances, the time of delay with increased accuracy (e.g., estimating the time to the tenth decimal place rather than an integer number). For example, peak 204 at sample 40 is identified in block 510 as having the lowest time delay before interpolation. In some implementations, after interpolation of block 512 and detecting a second plurality of peaks in step 514, the lowest time delay before interpolation changes. In some embodiments, the delay estimation system determines the in-phase (I) and quadrature (Q) components of the complex CIR separately and then computes the magnitude of a reconstructed complex CIR using the interpolated I and Q components to obtain a computed magnitude response that has a finer resolution than the resolution of the magnitude before interpolation. This is described in the description of FIG. 7. In some embodiments, the interpolated I and Q components are used to find peaks in the components separately. This is described in the description of FIG. 8.

At block 514, the delay estimation system determines, from the interpolated time domain representation of the complex CIR adjacent to the peak, a second plurality of peaks. In some implementations, the delay estimation system determines, after interpolating the data points between samples 35 and 41 (e.g., the peak region of peak 204) of the channel magnitude response of FIG. 2, smaller peaks that define the larger peak 204. In some embodiments the peaks at a finer sample resolution are determined for the I and Q components of the complex CIR separately. This is described in the description of FIG. 8.

At block 516, the delay estimation system identifies a second peak of the second plurality of peaks having a lowest time delay of the second plurality of peaks, wherein the second peak indicates a fine delay estimate of the complex CIR. In some embodiments, the peak identified at block 516 remains the same peak as that identified from block 510. For example, the delay estimation system determines from the interpolation that the magnitude values at finer sample points (e.g., 39.8, 39.9, 40.0, and 40.1 samples of delay), adjacent to the peak identified in block 510 (e.g., peak 204 at 40 samples of delay) are less than the magnitude of the peak identified in block 510. In some embodiments, the delay estimation system determines from the interpolation that there is peak adjacent to the peak detected in block 510 that has the lowest time delay of the peaks determined in block 514. In some implementations, the delay estimation system determines, using the finer sampling resolution obtained from the interpolation of step 512, that the lowest time delay before interpolation of the complex CIR of FIG. 2 is at 40.3 samples of delay rather than at the 40 samples of delay determined from step 510. In some embodiments, the delay estimation system interpolates I and Q components of the complex CIR separately and determines a single fine delay estimate based on two peak estimates from the I and Q components, respectively. This is described in the description of FIG. 8.

In some embodiments of a multi-antenna receiver system, the complex CIR is a combined channel estimate obtained from the received frequency domain channel estimates at each respective antenna. In some instances, blocks 508 through 516 are adapted for a multi-antenna system. In an example of a first scheme for combining FFTs received from multiple antennas, the frequency domain channel estimates received at each antenna are phase shifted (i.e., a signal shifted in time in the time domain) by a predetermined amount and combined (i.e., summed) with the frequency domain channel estimates of other antennas. In some implementations, the IFFT is then taken on this combined frequency domain channel estimate. Based on the predetermined phase shift amounts, the delay estimation system searches, in some instances, the appropriate region of the time domain complex CIR determined from the combined frequency domain channel estimate for the peak of the signal copy associated with the delay due to the RF components of a receiver. For example, in a 2-antenna system, a phase shift of 180° is applied to the frequency domain channel estimate of the second antenna and combined with the first antenna. An IFFT is then taken on the combined channel estimate. In this time domain representation of the complex CIR determined from the IFFT, the first antenna's CIR is present in the first half of the IFFT buffer and the second antenna's CIR is present in the second half of the IFFT buffer.

In an example of a second scheme for combining FFTs received from multiple antennas, downsampling in the frequency domain is implemented. For example, the delay estimation system performs downsampling in the frequency domain by an integer factor 'M' chosen such that the integer FFT size, N, is divisible by M. This downsampling of the channel estimate in the frequency domain is equivalent to zeroing out the time domain channel estimate beyond N/M samples (e.g., downsampling of a channel estimate having N=24 samples by M=2 will reduce the number of non-zero samples to at most 12). Downsampling by M in the frequency domain is equivalent to leaving every Mth sample in the time domain channel estimate (e.g., downsampling by 2 will only keep every other sample in the time domain channel estimate). In some embodiments, after performing the downsampling in the frequency domain, the delay estimation system phase shifts each antenna's frequency domain channel estimate by a predetermined amount and combines the phase-shifted frequency domain channel estimates from each antenna. The predetermined amount need not be applied to each antenna's frequency domain channel estimate nor does an equivalent predetermined amount need to be applied. In some embodiments, the delay estimation system then applies an IFFT on this combined frequency domain channel estimate. Further in these embodiments and based on the phase shift applied, the delay estimation system interleaves the time domain channel estimates from the different antennas. Finally, the delay estimation system performs the peak detection and time delay estimation on the interleaved time domain channel estimate. For example, in a two-antenna receiver system, the delay estimation system downsamples the frequency domain channel estimate from each antenna by an example of a factor of 2. An example of a phase shift of (360/N)° is applied to the frequency domain channel estimate of the second antenna, where N is the FFT size, and combined with that of the first antenna, which is not phase shifted. The delay estimation system then applies the IFFT on the combined frequency domain channel estimate from the two antennas. The interleaved time domain channel estimate then includes the first antenna's channel impulse response in the even samples (i.e., samples 0, 2, 4, . . . ) of the IFFT buffer and the second antenna's channel impulse response in the odd samples (i.e., samples 1, 3, 5, . . . ).

Figure 6:
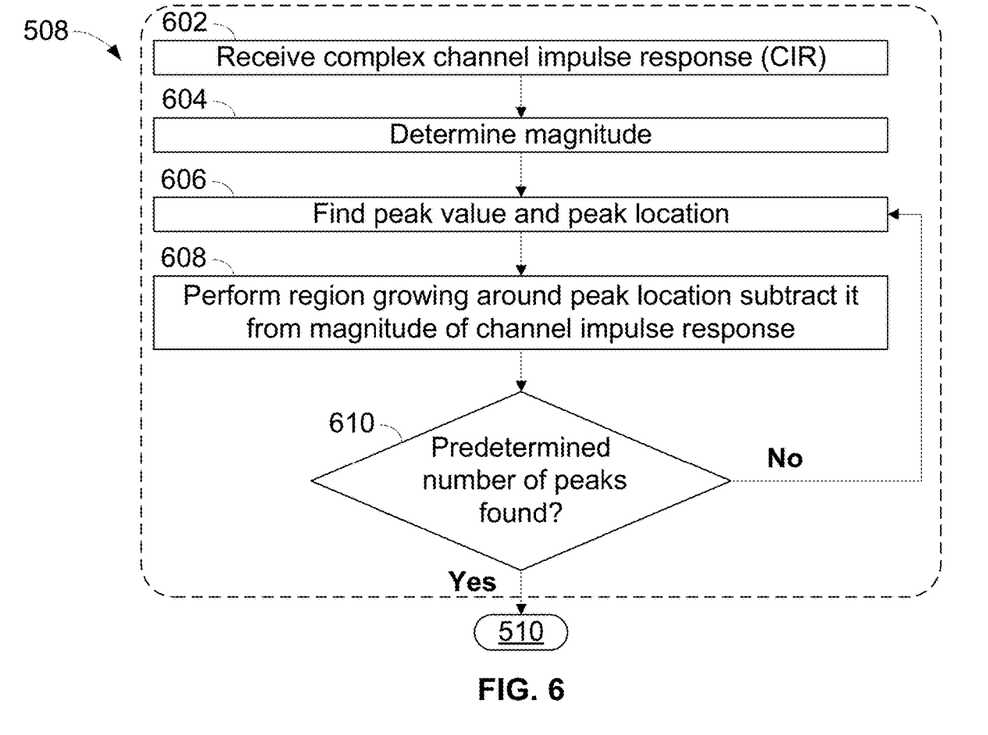
FIG. 6 illustrates a process for determining peaks of a time domain representation of a complex channel impulse response computed by the illustrative wireless communication system in a step of the illustrative process of FIG. 5 in accordance with at least some embodiments of the present disclosure.

FIG. 6 illustrates a process for determining peaks of a time domain representation of a complex channel impulse response computed by the illustrative wireless communication system in a step of the illustrative process of FIG. 5 in accordance with at least some embodiments of the present disclosure. In some embodiments, the process is performed by control circuitry of delay estimation system 100 described in FIG. 1. Blocks 602 through 610 illustrate and example of a manner for performing block 508 of FIG. 5.

At block 602, the delay estimation system receives a complex CIR. As described in FIG. 6, the complex CIR is a complex CIR in the time domain. In some embodiments, the delay estimation system receives a complex CIR as determined through blocks 400 through 408 of FIG. 4.

At block 604, the delay estimation system determines the magnitude of the complex CIR. In some embodiments, the delay estimation system determines the magnitude through computation using an approximate norm. The approximate norm is, for example, considered to be an approximation of the vector norm of a vector comprising the in-phase and quadrature components of the complex CIR. For example, the magnitude of a complex CIR (e.g., a vector of complex values) is calculated by a square root of the sum of the squared imaginary and real components.

At blocks 606 through 610, the delay estimation system determines peak regions. In some implementations, the delay estimation system determines peak regions through the steps described in FIG. 3. At block 606, the delay estimation system finds the peak value and peak location. In some embodiments, the delay estimation system searches for peaks in a region limited to samples to the left of the LOS peak or the peak having the largest magnitude. At block 608, the delay estimation system performs peak region detection by determining if the samples adjacent or around the peak are decreasing values relative to the value of the peak. In some instances, the delay estimation system determines if they are decreasing at a rate that meets a region growing threshold. A region growing threshold, for example, is understood to mean a threshold rate at which, when exceeding the threshold, the magnitude difference between two points defines a peak rather than what is not a peak (e.g., a plateau created by a set of data points defined by relatively small changes in magnitude between the points). In some instances, the threshold allows the delay estimation system to determine the boundaries of peak regions where the decrease is too minimal to be considered part of a peak region of an impulse response. In some embodiments, the delay estimation system implements a range limit for how far the peak region spans in samples to the left and right of a peak. This is illustrated through variables "Tth1" and "Tth2" of FIG. 3, where the counter "t" increments or decrements beyond a certain number of samples to the right and left of the peak location, respectively. At block 610, the delay estimation system determines if a predetermined number of peaks have been found. Block 610 is optional and provides a limit to the number of computations the delay estimation system otherwise performs, in some implementations, when finding peaks, especially for channels affected by large amounts of multipath or receiver systems having components that will delay a signal into many delayed components. If the delay estimation system has not found the predetermined number of peaks, it proceeds to step 606 to find another peak. Otherwise, the delay estimation system proceeds to step 510 to identify the peak of the peaks found in steps 606 and 608 having the lowest time delay.

Figure 7:
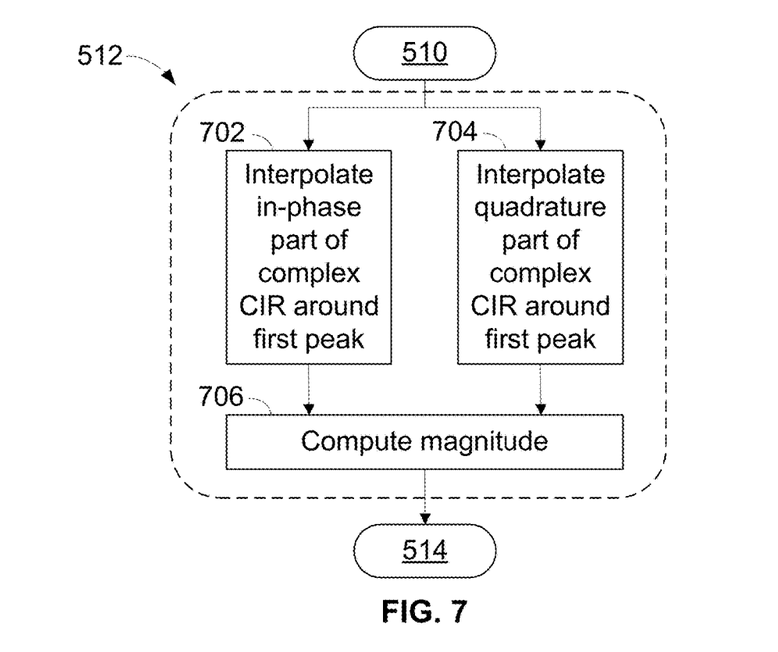
FIG. 7 illustrates a process for interpolating a complex channel impulse response computed by the illustrative wireless communication system in a step of the illustrative process of FIG. 5 in accordance with at least some embodiments of the present disclosure.

FIG. 7 illustrates a process for interpolating a complex channel impulse response computed by the illustrative wireless communication system in a step of the illustrative process of FIG. 5 in accordance with at least some embodiments of the present disclosure. In some instances, the process of FIG. 7 is performed by control circuitry of delay estimation system 100 described in FIG. 1. In some embodiments, blocks 702-706 provide details of operations performed at block 512 of FIG. 5 for interpolating the time domain representation of the complex CIR adjacent to the peak.

In some instances, the input into blocks 702 and 704 from block 510 is a first peak location or region from a complex CIR or two separate peaks—one peak location from the in-phase component of a complex CIR and one peak location from the quadrature component of a complex CIR. In some instances, interpolation of the time domain representation of the complex CIR adjacent to the peak is done separately for the in-phase and quadrature components, respectively, in blocks 702 and 704.

At block 706, the delay estimation system computes the magnitude of a reconstructed complex CIR from the interpolated in-phase component and the interpolated quadrature component of the CIR adjacent to the peak identified in block 510. With the reconstructed complex CIR, the delay estimation system proceeds to block 514 to determine, from the reconstructed complex CIR (i.e., the interpolated time domain representation of the complex CIR adjacent to the peak), a peak having the lowest delay relative to the arrival of the signal at the receiver.

Figure 8:
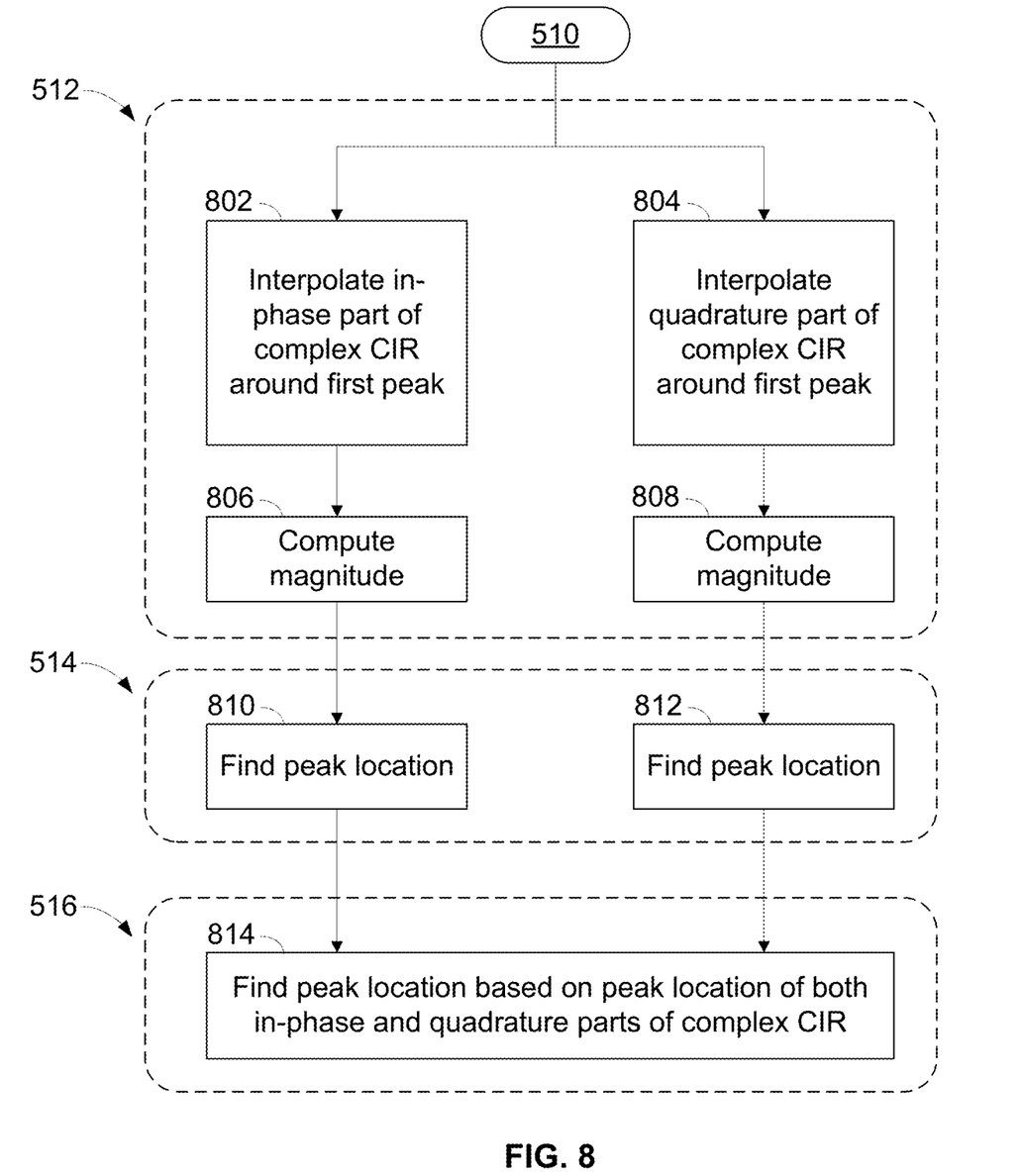
FIG. 8 illustrates a process for identifying peaks from interpolated in-phase and quadrature components of a complex channel impulse response computed by the illustrative wireless communication system in steps of the illustrative process of FIG. 5 in accordance with at least some embodiments of the present disclosure.

FIG. 8 illustrates a process for identifying peaks from interpolated in-phase and quadrature components of a complex channel impulse response computed by the illustrative wireless communication system in steps of the illustrative process of FIG. 5 in accordance with at least some embodiments of the present disclosure. In some implementations, the process of FIG. 8 is performed by control circuitry of delay estimation system 100 described in FIG. 1. FIG. 8 illustrates examples of additional operations performed at blocks 512, 514, and 516 of FIG. 5.

At blocks 802 and 804, which are similar to blocks 702 and 704 of FIG. 7, the delay estimation system interpolates the in-phase and quadrature components, respectively, of the complex CIR around (e.g., adjacent to) the first peak detected in block 510. At blocks 806 and 808, the delay estimation system computes the magnitude of the interpolated in-phase and quadrature components, respectively. In some implementations, the magnitude is computed within the interpolation step or in a separate step as illustrated. For example, block 802 includes decision to interpolate between in-phase components of samples 39 and 41 of FIG. 2 and block 806 find magnitudes of the in-phase components at samples 39.1, 39.2, . . . , 40.8, and 40.9. Blocks 802-808 are examples of additional operations performed at block 512 of FIG. 5.

At blocks 810 and 812, the delay estimation system finds the peak location having the lowest delay relative to the arrival of the signal at the receiver for both the interpolated in-phase component of the complex CIR and the interpolated quadrature component of the complex CIR. In some instances, a process as illustrated in FIG. 3 is used for detecting peak regions in the magnitude responses determined in blocks 806 and 808. From the determined peaks and corresponding peak regions, in some implementations, the delay estimation system then determines which peak has the lowest delay relative to the arrival time of the signal at the receiver.

At block 814, the delay estimation system finds a peak location based on the peak locations of both the I and Q components of the complex CIR. In some instances, the peak location indicates a finer estimate of the time delay. In some implementations, the peak locations of both the I and Q components of the complex CIR are combined to determine a peak location of the complex CIR in various ways. In some embodiments, the combining includes finding the minimum of the peak location, corresponding peak values, the samples of delay relative to the arrival of the signal at the receiver, any suitable minimum indicative of the lowest delay relative to the arrival of the signal at the receiver, or any combination thereof. For example, after interpolating the channel magnitude response of FIG. 2, the delay estimation system determines that the minimum of peak locations at samples 39.8 and 40.3 is the peak location at sample 39.8. Similarly, the minimum of peak values 70.1 Watts and 70.2 Watts is 70.1 Watts. In some embodiments, the combining includes calculating a weighted mean based on the peak locations of both the I and Q components.

$$\text{Peak}_{WM} = \frac{\alpha_1 * PeakLocation_I + \alpha_2 * PeakLocation_Q}{\alpha_1 + \alpha_2}$$

The equation above for the weighted mean peak location, PeakWM, defines the weighted mean peak location as a function of $\alpha_1$, $\alpha_2$, PeakLocationI, and PeakLocationQ, where $\alpha_1$ and $\alpha_2$ are weights and PeakLocationI and PeakLocationQ are the peak locations for I and Q, respectively, having the lowest delay relative to the arrival time of the signal at the receiver. In some embodiments, the values of the weights are integral values that are decided based on the importance factor imparted upon the I and Q components (e.g., $\alpha_1=1$ and $\alpha_2=1$ indicate that the I and Q components are equally important for calculating the weighted mean). In some embodiments, the values of the weights correspond to the peak values at PeakLocationI and PeakLocationQ (e.g., $\alpha_1$=PeakValueI and $\alpha_2$=PeakValueQ).

In some embodiments of multi-antenna receiver systems, a similar combination technique is applied using the peak locations determined at each antenna of the multi-antenna system. In some embodiments, a time delay estimate of a multi-antenna system is computed based on the determined time delay estimates at each antenna of the multi-antenna system. For example, the delay estimation system performs the single-antenna process described in the description of FIG. 5 for each antenna of the multi-antenna system and proceeds to an additional step of combining the identified second peak for each antenna. For example, in a 4-antenna system, the delay estimation system determines 4 peak locations for each of the received complex CIRs at the respective antennas. In some instances, the 4 peak locations are combined by taking the minimum, finding the weighted mean, any suitable calculation to determine a single peak location based on multiple peak locations, or any combination thereof. For example, the minimum for combining N antennas are represented by the operation:

$$\text{Min}(\text{PeakLocation}_1, \text{PeakLocation}_2, \ldots, \text{PeakLocation}_N)$$

where $\text{PeakLocation}_N$ corresponds to the peak location determined at the Nth antenna.

In some embodiments, the system calculates a weighted mean using the equation below to determine the peak location of the signal copy associated with the delay due to RF components of a receiver in a multi-antenna system, MultiAntPeakLocationWM.

$$\text{MultiAntPeakLocation}_{WM} = \frac{\alpha_1 * \text{PeakLocation}_1 + \alpha_2 * \text{PeakLocation}_2 + \ldots + \alpha_N \text{PeakLocation}_N}{\alpha_1 + \alpha_2 + \ldots + \alpha_N}$$

Figure 9:
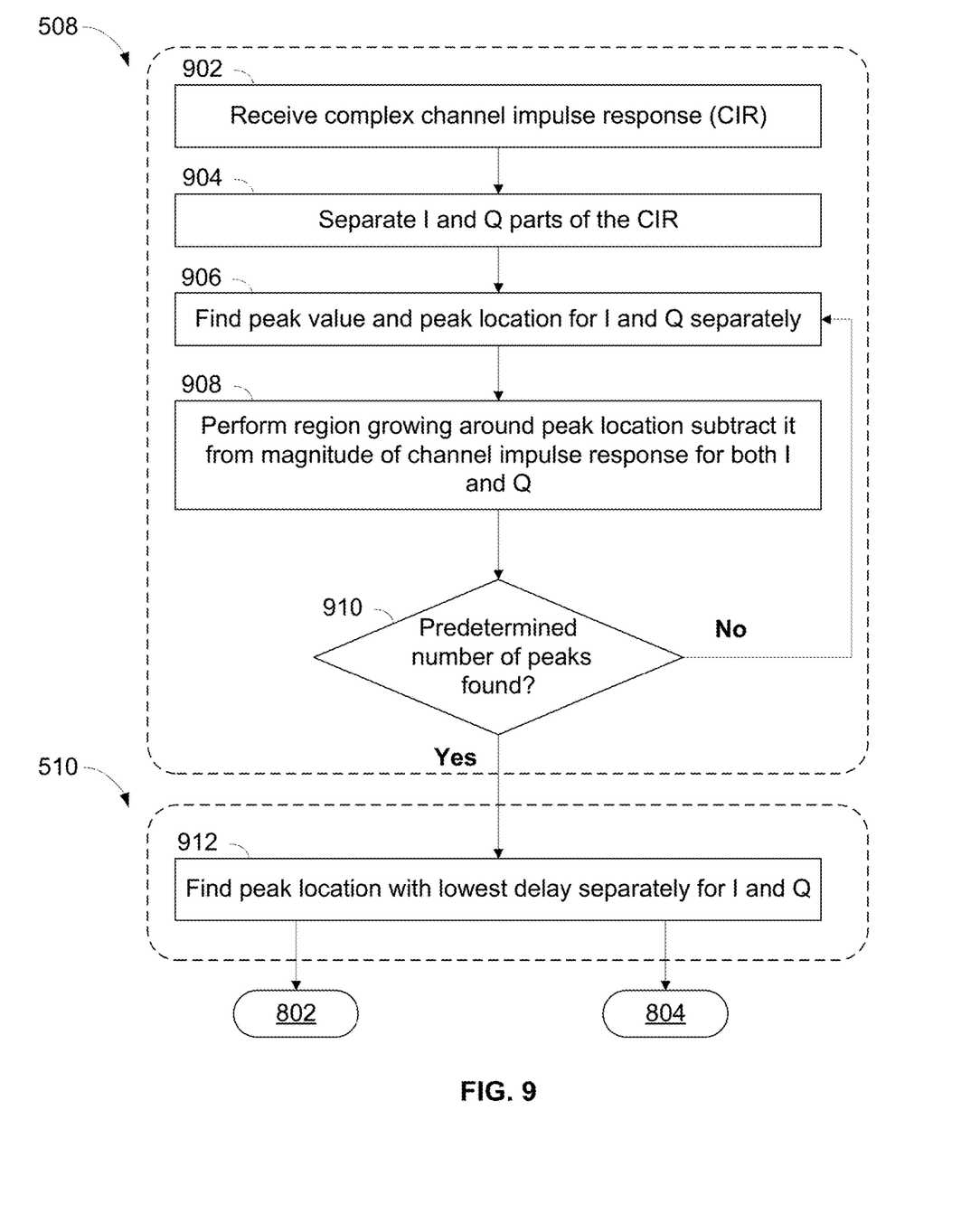
FIG. 9 illustrates a process for identifying peaks from in-phase and quadrature components of a complex channel impulse response computed by the illustrative wireless communication system prior to interpolation in steps of the illustrative process of FIG. 5 in accordance with at least some embodiments of the present disclosure.

FIG. 9 illustrates a process for identifying peaks from in-phase and quadrature components of a complex channel impulse response computed by the illustrative wireless communication system prior to interpolation in steps of the illustrative process of FIG. 5 in accordance with at least some embodiments of the present disclosure. In some implementations, the process of FIG. 9 is performed by control circuitry of delay estimation system 100 described in FIG. 1. FIG. 9 illustrates examples of subblocks of blocks 508 and 510 of FIG. 5.

Blocks 902 through 910 are examples of subblocks of block 508 of FIG. 5 for determining a first plurality of peaks of a time domain representation of a complex CIR. In some instances, block 902 functions similarly to block 602 when receiving the complex CIR. In some implementations, any of blocks 400 through 412 are used to receive and determine the time domain representation of the complex CIR. At block 904, the delay estimation system separates the in-phase and quadrature components of the complex CIR to find the peak values and locations for the I and Q components separately in block 906.

In some embodiments, at block 906, the delay estimation system determines peak values and peak locations for the I and Q components separately. For example, the delay estimation system determines that the peak location for the I component of the complex CIR received in block 902 is at 40 samples of delay and that the peak location for the Q component is at 39 samples of delay. In some instances, at block 908, the delay estimation system performs region growing around the peak locations determined in block 906 and subtracts the regions from the respective magnitude channel responses of both the I and Q. For example, the delay estimation system determines and zeroes a peak region in the I component of the complex CIR using the position counter and decision blocks (e.g., blocks 304 and 314). At block 910, the delay estimation system checks whether a predetermined number of peaks have been found. In some instances, block 910 is optional and is used to limit the computations undertaken by the delay estimation system when finding the peak location with the lowest delay. If the predetermined number of peaks have not been found, the delay estimation system returns to block 906 to find another pair of peak values and locations for the respective I and Q components. If the predetermined number of peaks have been found, the delay estimation system proceeds to block 912 to find a peak location with the lowest delay separately for both I and Q.

Block 912 is an example of an embodiment of block 510 of FIG. 5 for identifying a first peak of the first plurality of peaks having the lowest time delay of the first plurality of peaks. The lowest time delay, as similarly described in the description for FIG. 5, is taken relative to the arrival time of the signal at the receiver. At block 912, two peaks are identified: the peak of the I component having the lowest delay relative to the arrival time of signal at the receiver and the peak of the Q component having the lowest delay relative to the arrival time of the signal at the receiver. Following block 912, the delay estimation system proceeds to blocks 802 and 804 with the I and Q peak locations, respectively.

Various embodiments discussed in conjunction with FIGS. 1-9 are performed by various electronic components of one or more electronic circuits, such as but not limited to an integrated circuit, application-specific integrated circuit (ASIC), DSP, and/or the like. Various components discussed throughout this disclosure such as WLAN receivers implementing a delay estimation system and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 5 does not necessarily require the particular order shown, or sequential order, to achieve desirable results. In certain implementations, multitasking and parallel processing may be advantageous. Other variations are within the scope of the following claims.

What is claimed is:

1. A method for time delay estimation in a wireless communications system, the method comprising:
   receiving, from a transmitter, a signal, wherein the signal is delayed due to hardware components in a receiver;
   computing, at the receiver, a complex channel impulse response (CIR) of the signal, wherein the complex CIR comprises an in-phase component and a quadrature component;
   generating a time domain representation of the complex CIR;

determining a first plurality of peaks of the time domain representation of the complex channel impulse response (CIR);

identifying, from the first plurality of peaks, a first peak having a lowest time delay of the first plurality of peaks relative to an arrival time of the signal at the receiver;

interpolating, from the time domain representation of the complex CIR, a selection of data points adjacent to the first peak;

determining, from the interpolated selection of data points adjacent to the first peak, a second plurality of peaks; and identifying, from the second plurality of peaks, a second peak indicative of a time delay estimate of delay caused by the hardware components in the receiver and having a lowest time delay of the second plurality of peaks relative to the arrival time of the signal at the receiver.

2. The method for time delay estimation of claim 1, wherein determining the first plurality of peaks of the time domain representation of the complex CIR comprises:

determining, from the time domain representation of the complex CIR, the magnitudes of data points of the complex CIR indicative of a power of the complex CIR;

comparing the magnitudes of the data points of the complex CIR to a noise threshold; and selecting the first plurality of peaks having magnitudes surpassing the noise threshold.

3. The method for time delay estimation of claim 1, further comprising:

determining a data point of the complex CIR having the largest magnitude of data points of the complex CIR; and determining, based on magnitudes of the data points of the complex CIR, that the data point of the complex CIR is a peak of the first plurality of peaks.

4. The method for time delay estimation of claim 1, wherein interpolating, from the time domain representation of the complex CIR, the selection of data points adjacent to the first peak comprises:

interpolating a selection of data points of the in-phase component of the time domain representation of the complex CIR adjacent to the first peak; and interpolating a selection of data points of the quadrature component of the time domain representation of the complex CIR adjacent to the first peak.

5. The method for time delay estimation of claim 4, further comprising:

computing, based on the interpolated selection of data points of the in-phase component, the interpolated selection of data points of the quadrature component, a reconstructed time domain representation of the complex CIR; and wherein determining, from the interpolated selection of data points adjacent to the first peak, the second plurality of peaks comprises:

determining a data point of the reconstructed time domain representation of the complex CIR having the largest magnitude of data points of the reconstructed time domain representation of the complex CIR; and determining, based on decreasing magnitudes of data points adjacent to the data point, that the data point is a peak of the second plurality of peaks.

6. The method for time delay estimation of claim 4, wherein determining the second plurality of peaks comprises:

determining a data point of the in-phase component adjacent to the first peak having the largest magnitude of data points of the in-phase component adjacent to the first peak;

determining, based on magnitudes of data points of the in-phase component adjacent to the first peak, that the data point of the in-phase component adjacent to the first peak is a peak of a third plurality of peaks of the in-phase component adjacent to the first peak;

determining a data point of the quadrature component adjacent to the first peak having the largest magnitude of data points of the quadrature component adjacent to the first peak; and determining, based on magnitudes of data points of the quadrature component adjacent to the first peak, that the data point of the quadrature component is a peak of a fourth plurality of peaks of the quadrature component adjacent to the first peak.

7. The method for time delay estimation of claim 6, wherein identifying the second peak indicative of the time delay estimate of the delay caused by the hardware components in the receiver and having the lowest time delay of the second plurality of peaks relative to the arrival time of the signal at the receiver comprises:

identifying a third peak of the third plurality of peaks having a lowest time delay of the third plurality of peaks relative to the arrival time of the signal at the receiver;

identifying a fourth peak of the fourth plurality of peaks having a lowest time delay of the fourth plurality of peaks relative to the arrival time of the signal at the receiver; and determining the second peak using a weighted mean of respective time delays of the third peak and the fourth peak relative to the arrival time of the signal at the receiver.

8. The method for time delay estimation of claim 1, wherein the first plurality of peaks amounts to a predetermined number of determined peaks.

9. The method for time delay estimation of claim 4, wherein the first plurality of peaks comprises a plurality of peaks of the in-phase component and a plurality of peaks of the quadrature component and wherein determining the first plurality of peaks of the time domain representation of the complex CIR comprises:

separating the complex CIR into the in-phase component and the quadrature component;

determining a data point of the in-phase component having the largest magnitude of data points of the in-phase component;

determining, based on magnitudes of data points of the in-phase component, that the data point of the in-phase component is a peak of the plurality of peaks of the in-phase component;

determining a data point of the quadrature component having the largest magnitude of data points of the quadrature component; and determining, based on magnitudes of data points of the quadrature component, that the data point of the quadrature component is a peak of the plurality of peaks of the quadrature component.

10. The method for time delay estimation of claim 9, wherein identifying, from the first plurality of peaks, the first peak having the lowest time delay of the first plurality of peaks relative to the arrival time of the signal at the receiver comprises:

identifying a peak of the plurality of peaks of the in-phase component having a lowest time delay of the plurality of peaks of the in-phase component; and identifying a peak of the plurality of peaks of the quadrature component having a lowest time delay of the plurality of peaks of the quadrature component.

11. A system for time delay estimation in a wireless communications system, the system comprising:
a receiver configured to:
receive, from a transmitter, a signal, wherein the signal is delayed due to hardware components in a receiver; and
control circuitry coupled to the receiver, the control circuitry configured to:
compute, at the receiver, a complex channel impulse response (CIR) of the signal, wherein the complex CIR comprises an in-phase component and a quadrature component;
generate a time domain representation of the complex CIR;
determine a first plurality of peaks of the time domain representation of the complex channel impulse response (CIR);
identify, from the first plurality of peaks, a first peak having a lowest time delay of the first plurality of peaks relative to an arrival time of the signal at the receiver;
interpolate, from the time domain representation of the complex CIR, a selection of data points adjacent to the first peak;
determine, from the interpolated selection of data points adjacent to the first peak, a second plurality of peaks; and
identify, from the second plurality of peaks, a second peak indicative of a time delay estimate of the delay caused by the hardware components in the receiver and having a lowest time delay of the second plurality of peaks relative to the arrival time of the signal at the receiver.

12. The system for time delay estimation of claim 11, wherein the control circuitry is configured to determine the first plurality of peaks of the time domain representation of the complex CIR by:
determining, from the time domain representation of the complex CIR, the magnitudes of data points of the complex CIR indicative of a power of the complex CIR;
comparing the magnitudes of the data points of the complex CIR to a noise threshold; and
selecting the first plurality of peaks having magnitudes surpassing the noise threshold.

13. The system for time delay estimation of claim 11, the control circuitry further configured to:
determine a data point of the complex CIR having the largest magnitude of data points of the complex CIR; and
determine, based on magnitudes of the data points of the complex CIR, that the data point of the complex CIR is a peak of the first plurality of peaks.

14. The system for time delay estimation of claim 11, wherein the control circuitry is further configured to interpolate, from the time domain representation of the complex CIR, the selection of data points adjacent to the first peak by:
interpolating a selection of data points of the in-phase component of the time domain representation of the complex CIR adjacent to the first peak; and interpolating a selection of data points of the quadrature component of the time domain representation of the complex CIR adjacent to the first peak.

15. The system for time delay estimation of claim 14, the control circuitry further configured to:
compute, based on the interpolated selection of data points of the in-phase component, the interpolated selection of data points of the quadrature component, a reconstructed time domain representation of the complex CIR; and
wherein the control circuitry is configured to determine, from the interpolated selection of data points adjacent to the first peak, the second plurality of peaks by:
determining a data point of the reconstructed time domain representation of the complex CIR having the largest magnitude of data points of the reconstructed time domain representation of the complex CIR; and
determining, based on decreasing magnitudes of data points adjacent to the data point, that the data point is a peak of the second plurality of peaks.

16. The system for time delay estimation of claim 14, wherein the control circuitry is configured to determine the second plurality of peaks by:
determining a data point of the in-phase component adjacent to the first peak having the largest magnitude of data points of the in-phase component adjacent to the first peak;
determining, based on magnitudes of data points of the in-phase component adjacent to the first peak, that the data point of the in-phase component adjacent to the first peak is a peak of a third plurality of peaks of the in-phase component adjacent to the first peak;
determining a data point of the quadrature component adjacent to the first peak having the largest magnitude of data points of the quadrature component adjacent to the first peak; and
determining, based on magnitudes of data points of the quadrature component adjacent to the first peak, that the data point of the quadrature component is a peak of a fourth plurality of peaks of the quadrature component adjacent to the first peak.

17. The system for time delay estimation of claim 16, wherein the control circuitry is configured to identify the second peak indicative of the time delay estimate of the delay caused by the hardware components in the receiver and having the lowest time delay of the second plurality of peaks relative to the arrival time of the signal at the receiver by:
identifying a third peak of the third plurality of peaks having a lowest time delay of the third plurality of peaks relative to the arrival time of the signal at the receiver;
identifying a fourth peak of the fourth plurality of peaks having a lowest time delay of the fourth plurality of peaks relative to the arrival time of the signal at the receiver; and
determining the second peak using a weighted mean of respective time delays of the third peak and the fourth peak relative to the arrival time of the signal at the receiver.

18. The system for time delay estimation of claim 11, wherein the first plurality of peaks amounts to a predetermined number of determined peaks.

19. The system for time delay estimation of claim 14, wherein the first plurality of peaks comprises a plurality of peaks of the in-phase component and a plurality of peaks of the quadrature component and wherein the control circuitry is configured to determine the first plurality of peaks of the time domain representation of the complex CIR by:
- separating the complex CIR into the in-phase component and the quadrature component;
- determining a data point of the in-phase component having the largest magnitude of data points of the in-phase component;
- determining, based on magnitudes of data points of the in-phase component, that the data point of the in-phase component is a peak of the plurality of peaks of the in-phase component;
- determining a data point of the quadrature component having the largest magnitude of data points of the quadrature component; and
- determining, based on magnitudes of data points of the quadrature component, that the data point of the quadrature component is a peak of the plurality of peaks of the quadrature component.

20. The system for time delay estimation of claim 19, wherein the control circuitry is configured to identify, from the first plurality of peaks, the first peak having the lowest time delay of the first plurality of peaks relative to the arrival time of the signal at the receiver by:
- identifying a peak of the plurality of peaks of the in-phase component having a lowest time delay of the plurality of peaks of the in-phase component; and
- identifying a peak of the plurality of peaks of the quadrature component having a lowest time delay of the plurality of peaks of the quadrature component.

* * * * *